UNITED STATES PATENT OFFICE.

CHRISTOPHER RIS, OF BASLE, SWITZERLAND, ASSIGNOR TO JOHN R. GEIGY & CO., OF SAME PLACE.

BROWN DYE AND PROCESS OF MAKING SAME.

SPECIFICATION forming part of Letters Patent No. 548,460, dated October 22, 1895.

Application filed June 18, 1895. Serial No. 653,196. (Specimens.)

*To all whom it may concern:*

Be it known that I, CHRISTOPHER RIS, a citizen of the Republic of Switzerland, residing at Basle, Switzerland, have invented certain new and useful Improvements in the Manufacture of Brown Coloring-Matter, of which the following is a specification.

This invention has reference to the manufacture of brown coloring-matter, which is obtained by the action of pyrogallic acid on a diazo compound of para-amidophenol and its sulfo-acids.

It was heretofore supposed that pyrogallic acid was not able to form azo colors in an alkaline solution with diazo compounds. I have discovered, however, that the diazo compounds of para-amidophenol and its sulfo-acids easily form with pyrogallic acid in an alkaline solution azo colors which possess the property of furnishing very fast and intense brown colors on chrome-mordanted wool or cotton fabrics both in dyeing and printing; and my invention, therefore, consists, first, of the process herein described of forming a brown coloring-matter by subjecting the diazo compound of para-amidophenol or its sulfo-acids to the action of pyrogallic acid in an alkaline solution, and, secondly, of a brown coloring-matter being tetraoxyazobenzene, having the constitutional formula and characteristics hereinafter more fully described, and finally pointed out in the claims.

The coloring-matter which is obtained from para-amidophenol by the action of pyrogallic acid in an alkaline solution can be considered as tetraoxyazobenzene, having the following constitutional formula:

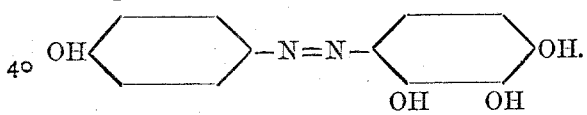

It is obtained in the form of a thick dark-brown paste or a dark-brown powder, which dissolves in hot water into a yellow color and is easily soluble in alkalies with an intensely-dark-brown color, and the alkaline solution of which is oxidized by the oxygen of the air and becomes discolored thereby. The solution in concentrated sulfuric acid shows an orange color. The sulfo-acids of this brown coloring-matter are easily soluble in cold water, but possess otherwise the same characteristics.

The following example describes the production of the color more specifically: Fourteen kilograms of para-amidophenol are dissolved in one hundred liters of boiling water, to which forty kilograms of hydrochloric acid of 21° Baumé are added. When the solution is cold, two hundred kilograms of ice are added, the solution being then diazotized with nine kilograms of sodium nitrite. A cold solution of seventeen kilograms of pyrogallic acid in fifty liters of water is next added, and after this a solution of thirty kilograms of sodium carbonate in one hundred liters of water. The solution is permitted to stand for several hours, the coloring-matter being then precipitated by the addition of fifty kilograms of acetic acid of forty per cent. and then filtered off.

In place of fourteen kilograms of para-amidophenol may be used thirty-four kilograms of alpha-para-amidophenoldisulfo-acid (see German Patent No. 65,236) or twenty-five kilograms of para-amidophenolmonosulfo-acid. The diazotation of the solution can then be carried out in a weaker acid solution, it requiring only seventeen kilograms of hydrochloric acid for the diazotizing process, which is then completed, as before described.

Having thus described my invention, I claim as new and desire to secure by Letters Patent—

1. The process herein described of making a brown coloring matter, which consists in subjecting the diazo-compound of para-amidophenol or its sulfo-acids to the action of pyrogallic acid in an alkaline solution, substantially as set forth.

2. The brown coloring matter herein described, being tetraoxyazobenzene, which is obtained in the form of a dark brown paste or powder that is soluble in hot water with a yellow color, easily soluble in alkalies with an intensely dark brown color, and the alkaline solution of which is oxidized by the action of oxygen of the air so as to become discolored, and forming with concentrated sulfuric acid an orange-colored solution, substantially as set forth.

In testimony that I claim the foregoing as my invention I have signed my name in presence of two subscribing witnesses.

CHRISTOPHER RIS.

Witnesses:
 GEORGE GIFFORD,
 T. C. FRAEHELIN.